United States Patent [19]

Smatko

[11] 3,734,781

[45] May 22, 1973

[54] LOW-GASSING HIGH STRENGTH BATTERY SEPARATOR AND METHOD OF PRODUCTION

[75] Inventor: Joseph S. Smatko, Santa Barbara, Calif.

[73] Assignee: McDonnell Douglas Corporation, Santa Monica, Calif.

[22] Filed: Oct. 19, 1970

[21] Appl. No.: 81,827

[52] U.S. Cl. ................................................136/146
[51] Int. Cl. ................................................H01m 3/00
[58] Field of Search................136/6, 83, 30, 146, 136/148; 204/295; 106/39 R, 40, 60; 252/62.59, 449

[56] References Cited

UNITED STATES PATENTS 3,446,668  5/1969  Arrance et al............................136/6

Primary Examiner—Winston A. Douglas
Assistant Examiner—H. A. Feeley
Attorney—Max Geldin

[57] ABSTRACT

Production of inorganic porous sintered battery separator substantially reducing formation of gas when in contact with a zinc electrode, and having a dendrite formation inhibiting effect on such zinc electrode, permitting long cycle life of a high energy density battery such as a silver-zinc or nickel-zinc battery, and providing a sealed battery, produced by firing or sintering a compacted magnesium silicate-iron silicate composition, e.g., derived from the mineral olivine, and containing combined lead, e.g., as lead silicate, at temperature ranging from about 1,000°C to about 1,300°C in non-oxidizing atmosphere, e.g., a carbon monoxide-carbon dioxide atmosphere, to produce a porous sintered membrane consisting essentially of magnesium silicate, iron silicate and combine lead, e.g., in the form of lead silicate, the iron content thereof being substantially entirely in ferrous form.

22 Claims, 1 Drawing Figure

Patented May 22, 1973
3,734,781
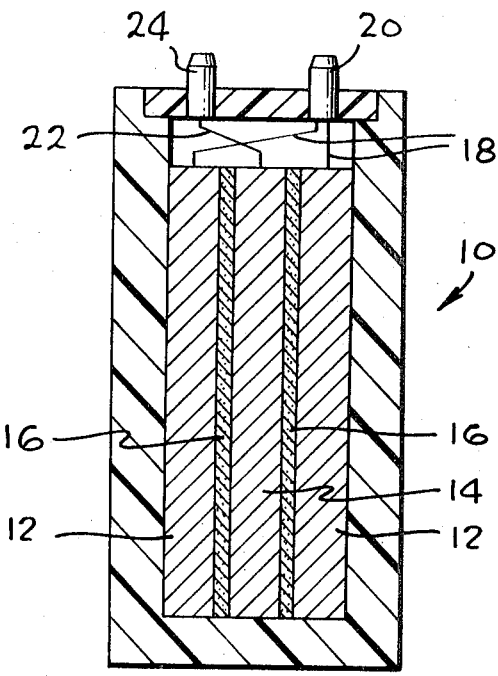
JOSEPH S. SMATKO
INVENTOR.
BY Max Geldin
ATTORNEY

LOW-GASSING HIGH STRENGTH BATTERY SEPARATOR AND METHOD OF PRODUCTION

This invention relates to batteries, particularly high energy density batteries and is especially concerned with the production of improved inorganic membranes or separators for use in such batteries, especially a high energy density battery containing a zinc electrode, such separators having substantially reduced tendency to cause gassing when in contact with a zinc electrode, thereby permitting production of hermetically sealed batteries of this type having extended life, which can operate as a secondary battery over a large number of charge-discharge cycles efficiently; with novel procedure for producing such separators; and with improved battery constructions embodying such improved separators.

This application is a continuation-in-part of my copending application, Ser. No. 70,400, filed Sept. 8, 1970, entitled LOW-GASSING BATTERY SEPARATOR AND METHOD OF PRODUCTION.

Batteries are an important source of energy storage for power generation. Important types of battery particularly suited for such applications are the high energy density alkaline electrolyte cells such as the silver-zinc, zinc-air and nickel-zinc batteries. High energy density batteries are generally battery systems which have a substantially higher energy per unit of weight than conventional, e.g., lead, storage batteries. In addition to important airborne applications, such high energy density batteries have many other applications such as in portable tools and appliances, television, radio and record players, engine starting, portable X-ray units and the like.

In high energy density batteries such as silver-zinc and nickel-zinc batteries, the electrodes are placed adjacent opposite sides of a membrane or separator which performs the function of retaining electrolyte, separating the electrodes, and permitting transfer of electrolyte ions while inhibiting migration of electrode ions. For activation of these batteries, the battery or the components thereof such as the separator are filled with an aqueous alkaline electrolyte in the form of an aqueous solution of an alkali such as potassium hydroxide.

High energy density batteries of the above type, particularly those employing an inorganic separator, are particularly useful as secondary batteries which can be charged and discharged periodically, and can operate at elevated as well as at normal temperatures.

One form of particularly useful inorganic separator for such high energy density batteries, such as silver-zinc batteries is disclosed in U.S. Pat. No. 3,446,668. Such inorganic separator is in the form of a sintered porous member composed of magnesium silicate and iron silicate. According to the patent, such separators in addition to being formed from synthetic mixtures of iron-bearing material, magnesium-bearing material, and silica, can be formed from the naturally occurring mineral olivine, a magnesium-iron silicate.

Although the magnesium silicate-iron silicate separator of the above patent has proved successful in high energy density batteries, including silver-zinc batteries when such batteries or cells are vented, it has been found from experience that cells incorporating such separators and containing a zinc electrode, eventually develop gas. Thus, when non-vented or sealed cells such as a sealed silver-zinc battery containing the above noted magnesium silicate-iron silicate separator is cycled, such batteries eventually develop gas, although such cells can be cycled from about 12 to about 80 cycles on shallow cycling regimes without excessive pressure rise. However, thereafter such cells gas significantly during overcharge, and on standing, and in due course of time the pressure rise is sufficiently great to present the danger of rupture of the battery case. Analysis of the gas generated in such batteries shows the major component to be hydrogen.

Tests have been devised to determine the gassing potential of the various cell components. One such test is based on mixing a predetermined weight of test material, such as particulate sintered magnesium silicate-iron silicate separator material produced according to the above patent, with a pre-established amount of zinc powder, compressing the mixture and then exposing the compressed pellet to about 30% KOH solution. The gas produced is collected and measured over a certain time period, the amount of gas collected providing a measure of the degree of activity toward gassing of the above noted separator material in contact with the zinc. This test showed that the magnesium silicate-iron silicate separator material of the above patent is very prone to cause gassing when in contact with zinc.

Attempts were made to de-activate the gassing sites with sulfide treatment or with quinoline, but these failed to yield a long term and satisfactory solution to the gassing problem of the magnesium silicate-iron silicate separator material. Other attempts involved the application of a thin coating of a non-gassing ceramic material such as zirconia on the sintered magnesium silicate-iron silicate, or olivine, separator member of the above patent. At best, this latter technique served only to delay to a minor extent the onset of significant gassing when such coated separator was used in a silver-zinc cell, but did not provide a satisfactory solution to the problem.

It was found that after sintering or firing the raw material olivine in a gas fired kiln to produce the sintered porous separator, according to the procedure of the above U.S. Pat. No. 3,446,668, the original off-white colored olivine changed to a deep red-brown color, indicating partial decompositon and the oxidation of a portion of the ferrous iron in the olivine to $Fe_2O_3$ and small amounts of $Fe_3O_4$, depending upon the firing conditions. The presence of ferric compounds in the resulting separator is noted in the patent. It was found that these higher oxidation states of the iron in the olivine, produced upon firing the olivine in a gas-fired kiln in the presence of combustion gases and air, when in contact with zinc promotes dissolution of the zinc with liberation of hydrogen gas at marked rates.

It was discovered according to the invention of my above copending application that if the magnesium silicate-iron silicate composition, or olivine, e.g., in compacted form, is sintered or fired in a controlled atmosphere containing a reducing gas, particularly a combination of carbon monoxide and carbon dioxide (hereinafter also referred to as "$CO/CO_2$") gases, or an inert gas, under conditions to maintain the iron content of the starting mixture in the ferrous form with substantially no ferric oxides produced, the resulting sintered magnesium silicate-iron silicate separators have substantially lower gassing rates when in contact with a zinc electrode as compared to separators produced from the same starting materials but by sintering in the presence of oxidizing gases including air, according to the procedure of the above patent.

It has now been found according to the present invention that if lead combined in suitable form, e.g., as lead silicate, is incorporated preferably in minor amount in the above noted magnesium silicate-iron silicate composition, e.g., olivine, and the resulting composition in compacted form is fired or sintered in a controlled type atmosphere, e.g., a $CO/CO_2$ atmosphere, to maintain the iron content of the above composition in ferrous form, the resulting sintered porous member containing combined lead and iron silicate in ferrous form, has substantially lower gassing tendency when in contact with zinc, and has substantially higher strength, than the porous sintered membrane or separator produced according to my above copending application. Thus, for example, as will be pointed out hereinafter, gassing rates of the porous membranes or separators produced according to the present invention, and containing combined lead, can be less than one-half the gassing rates for the magnesium silicate-iron silicate separators of my above copending application, and also with a transverse strength or modulus of rupture which can be double that for the magnesium silicate-iron silicate separators disclosed in U.S. Pat. No. 3,446,668.

Briefly then, the process of the present invention for producing a low-gassing separator when employed with a zinc electrode, and having high strength and good resistance to alkali, is produced by a process which comprises sintering a compacted magnesium silicate-iron silicate composition containing combined lead, at temperature ranging from about 1,000°C. to about 1,300°C. in a non-oxidizing atmosphere particularly an atmosphere selected from the group consisting of a reducing gas and an inert gas atmosphere, under conditions to maintain the iron content of such composition in the ferrous form.

A particularly effective reducing gas atmosphere for carrying out the above noted sintering to maintain the iron content of the composition in ferrous form, is a properly balanced mixture of carbon monoxide and carbon dioxide, hereinafter also denoted a $CO/CO_2$ atmosphere, and an effective inert gas atmosphere being argon.

In carrying out the present invention for producing the lead-containing magnesium silicate-iron silicate porous separators of the invention, a compacted starting mixture of olivine or equivalent synthetic mixture described more fully hereinafter, and containing a suitable lead-bearing material or lead compound as described more fully below, is first subjected to firing or sintering preferably in a controlled or balanced reducing or inert atmosphere described above, to cause reaction between the components of such mixture to form a magnesium silicate-iron silicate containing lead combined therewith, i.e., in the form of lead silicate.

The resulting reacted mixture in compacted form is then again sintered in a reducing or an inert atmosphere, e.g., a $CO/CO_2$ or argon atmosphere, to maintain the iron content of the composition in ferrous form, usually at a lower sintering temperature than the temperature of the initial firing operation, to develop the desired structure of the separator in terms of high strength, desired porosity and low resistivity, and having the resulting important property of being very low-gassing when in contact with a zinc electrode in a battery, to provide a battery having a long cycle life yet which can be hermetically sealed.

In carrying out the invention for obtaining the improved lead-containing magnesium silicate-iron silicate separator hereof, a synthetic mixture of suitable iron-bearing, magnesium-bearing, lead-bearing and $SiO_2$-bearing material is formed, generally in proportions by weight of about 1 percent to about 65 percent preferably about 1 percent to about 26 percent, of iron or iron-bearing material or compound calculated as ferrous oxide (FeO); about 4 percent to about 56 percent, preferably about 14 percent to about 56 percent, of magnesium or magnesium-bearing material or compound calculated as MgO, about 0.4 percent to about 69 percent, preferably about 1 percent to about 48 percent, lead or lead-bearing material or compound calculated as PbO, and about 15 percent to about 43 percent, preferably about 24 percent to about 32 percent, of silica ($SiO_2$).

Suitable iron-bearing materials or iron compounds which can be employed include, for example, ferrous or ferric salts, such as the sulfate or chloride, ferrous or ferric oxide, or metallic iron powder, or mixtures of the above ferrous or ferric compounds, and iron powder. Also, there can be employed naturally occurring iron minerals such as magnetite, hematite, Siderite, Fayelite, rouge, and particularly olivine.

As sources for suitable magnesium-bearing materials or magnesium compounds, there can be employed magnesium carbonate, magnesium sulfate, magnesium nitrate, magnesium chloride, magnesium oxide, and the naturally occurring minerals talc, Enstatite, Magnesite, Forsterite, and particularly olivine.

As noted above, olivine can be employed as source of both the iron and magnesium of the starting mixture.

As source for the lead, or lead-bearing material or compound, there can be employed lead acetate, lead dioxide, white lead, red lead, litharge, lead hydroxide, tribasic lead silicate, lead sulfate, lead powder, basic lead acetate (also known as lead subacetate) and lead nitrate. Even lead sulfide (galena) may be used during the initial or oxiding firing. Natural minerals such as Cerrusite ($PbCO_3$), Anglesite ($PbSO_4$), and the like, also can be used, if desired.

As a source of suitable $SiO_2$-bearing material, there can be employed for example, flint, silica, sand, diatomaceous earth or magnesium silicate, silica gel, silicic acid, fume silica, and the like.

The starting mixture of iron-bearing, magnesium-bearing and lead-bearing materials and silica, can be produced, for example, by first forming a solution of the lead compound, e.g., lead acetate or lead nitrate in a suitable solvent, such as water or an organic solvent, e.g., methanol, ethanol, and the like, where such lead compound is water or solvent soluble, and the solution of lead compound then added to the other components, e.g., olivine or a synthetic mixture of the magnesium and iron-bearing materials, and silica-bearing material, to yield a thick mixture or paste. The mixture is stirred to evaporate at least a portion of the solvent, to form a crumbly damp mass. Where the lead-bearing material or compound is insoluble, the latter material can be mixed with the other above noted components, e.g., by ball milling in the presence of water, and the mixture filtered and dried, and the dried mixture is then crumbled. Preferably, there is added to the crumbly mass formed by either of the above procedures, a small amount, e.g., about 2 percent to about 10 percent by weight of total inorganics, of an organic binder, such as a polyethylene glycol, e.g., Carbowax, beeswax, or paraffin wax, generally dissolved in a suitable solvent such as acetone or toluene, and the resulting mixture dried, e.g., at ambient temperature or at elevated temperature to remove solvent. Although the addition of an organic binder is not necessary, it is preferred to employ such binder to provide adequate "green strength" for handling.

The resulting crumbly mass is then pressed into blocks at pressures of about 2,000 to about 20,000 psi, the presence of the binder aiding in this operation. Such blocks are then fired first in air at temperature of the order of about 400°C. to about 600°C. for a period of time of about 15 minutes up to about 4 hours, removing the organic binder, and then fired at temperature of the order of about 1,100°C. to about 1,400°C. The latter firing operation preferably is carried out in the presence of a reducing atmosphere, e.g., a $CO/CO_2$ atmosphere or an inert argon atmosphere, to maintain the iron content of the mixture in the ferrous form and to convert any ferric species to the ferrous form. However, this initial firing operation alternatively can be carried out in air, relying on the subsequent sintering operation pointed out more fully below, to maintain the iron content of the mixture in the ferrous form and to convert any ferric species to the ferrous form.

The initial sintering operation noted above generally is carried out for a period of about 1 to about 8 hours.

Such initial firing operation causes reaction between the various components of the mixture to convert the mixture into a magnesium silicate-iron silicate, containing the lead component in combined form. The lead component according to present information is also believed to be in the form of a lead silicate. During such initial firing operation, at the high temperatures, the various components, e.g., the magnesium, iron and lead-bearing materials or compounds, are converted to the oxides and then by reaction forming with the silica component, the magnesium-iron-lead silicate having the general formula:

$$2(Mg_aFe_bPb_c)O \cdot SiO_2$$

The values for $a$, $b$ and $c$ subscripts of the above formula vary depending upon the relative proportions of the magnesium-iron- and lead-bearing materials, and silica employed.

The resulting initially fired pressed blocks, following cooling thereof, are granulated or pulverized, and the granular material can be ball-milled with water or other liquid medium such as acetone, the material filtered and the wet cake mixed with a solvent solution, e.g., an acetone solution, of an organic binder of the types noted above, such as Carbowax, in an amount noted above. The resulting material is then dried and the resulting crumbs are granulated and the particles further reduced in size, e.g., by pressing granulation, as through a screen. The resulting powder is then pressed into blocks or plaques at pressures, e.g., ranging from about 2,000 to about 20,000 psi, and fired or sintered, e.g., in an electric furnace, first in air at temperature of the order of about 400°C to about 600°C for a period of about 15 minutes to about 4 hours, to remove the organic binder, followed by sintering at temperature of the order of about 1,100°C to about 1,300°C for a period of about 10 minutes to about 6 hours in a reducing atmosphere such as a $CO/CO_2$, or in an inert, e.g., argon atmosphere, to maintain the iron content of the compressed plaque in the ferrous form or to convert any ferric species thereof to the ferrous form.

Following the firing or sintering operation in a controlled, e.g., $CO/CO_2$ or argon atmosphere, the separators are maintained in this reducing atmosphere in the furnace during the cooling period down to about 500°C to about 300°C. The reason for this is that at these high temperatures of about 1,300°C down to about 300°C, at least some of the ferrous content of the fired separators would be converted to ferric oxides in the absence of such reducing atmosphere, which is specifically avoided in order to obtain the improved low-gassing separators, and hence such cooling between about 1,300°C down to about 500° to 300°C is carried out in the same controlled, e.g., $CO/CO_2$ or argon atmosphere, present during such final firing or sintering operation. Thereafter, the separators are cooled rapidly. When employing a $CO/CO_2$ atmosphere, upon reaching about 500°C one can turn off the $CO/CO_2$ and substitute an inert gas such as argon or nitrogen down to a temperature of 300°C and then air can be admitted.

The resulting sintered separators are generally in the form of solid solutions of magnesium silicate, ferrous silicate and the combined lead, believed to be lead silicate. The resulting separators formed following the second sintering operation in either a reducing or an inert gas atmosphere, have a composition ranging from about 1 to about 99 mol percent magnesium silicate, about 1 to about 90 mol percent ferrous silicate, and about 0.1 to about 50 mol percent combined lead as lead silicate, such ranges preferably being from about 45 to about 98 mol percent magnesium silicate, about 2 to about 30 mol percent ferrous silicate, and about 0.2 to about 25 mol percent of combined lead as lead silicate.

The second sintering operation carried out, e.g., in a $CO/CO_2$ atmosphere or an argon atmosphere, in addition to maintaining the iron content of the initially fired magnesium-iron-lead silicate in the ferrous form with substantially none of such iron content being converted to the higher valence ferric species, thus resulting in a very low gassing separator in the presence of a zinc electrode, also develops the structure of the separator, and it has been found unexpectedly that the resulting separator containing lead has an unusually high transverse strength or modulus of rupture ranging from about 5,000 up to about 20,000 psi, often in the very high strength range of between about 15,000 and about 20,000 psi, which is an unusually high transverse strength for an inorganic battery separator. In addition, the types of initial starting components and the sintering temperature, particularly the temperature of the second sintering operation, can be varied to provide a porosity corresponding to a water absorption ranging from about 5 percent to about 50 percent. In addition, it has been found that the presence of lead as a component of the starting mixture in the final separator, according to the invention, inhibits formation of zinc dendrites when in contact with a zinc electrode in a battery, as well as very substantially reducing gassing when in contact with a zinc electrode, which not only permits production of hermetically sealed batteries, but permits higher charging efficiency of the zinc electrode and greatly enhancing the cycle life of high energy density batteries containing a zinc electrode such as the silver-zinc and nickel-zinc batteries. The higher electrical efficiency of the lead-containing magnesium silicate-ferrous silicate separators of the invention further results from the low resistivity of the separators produced according to the invention, which can range from about 5 to about 50 ohm-cm and such separators also have high resistance to alkali.

The magnesium silicate-iron silicate-lead silicate separator material produced according to the invention, and converted or granulated to a ground particulate form, can be employed as inorganic separator material used in flexible separators. These include, for example, the flexible separators described in the copending application, Ser. No. 676,224, filed Oct. 18, 1967 of F. C. Arrance, et al., now abandoned and consisting, for example, of a porous inorganic material, which can be the above noted magnesium silicate-ferrous silicate-lead silicate improved separator material of the present invention, and a minor portion of a water coaguable organic fluorocarbon polymer such as a vinylidene fluoride polymer, to bond the particles of the inorganic material.

Also, the above noted particulate magnesium silicate-iron silicate-lead silicate separator material produced according to the invention can be employed as the inorganic material in the flexible separators described in the copending application, Ser. No. 676,223, filed Oct. 18, 1967, now U.S. Pat. No. 3,542,596 of F. C. Arrance, and consisting for example of a major portion of such inorganic material, e.g., the above noted magnesium-ferrous-lead silicate separator material of the invention, a minor portion of potassium titanate, and a minor portion of a cured organic polymer such as polyphenylene oxide as bonding agent.

Further, the improved inorganic separator material of the present invention can be applied in the copending application, Ser. No. 707,808, filed Feb. 23, 1968, of F. C. Arrance, et al., now abandoned in favor of continuation application Ser. No. 154,218, filed June 17, 1971, disclosing an improved flexible porous separator, which can be box-shaped to provide a compartment for a battery electrode, produced by applying on a flexible porous substrate, such as flexible sheets or mats of various materials including potassium titanate paper, asbestos, aluminosilicate sheets, and the like, a film comprising a mixture of a magnesium silicate-ferrous silicate-lead silicate separator material according to the invention, and an organic polymeric bonding agent of various types, such as polyphenylene oxide, or a fluorocarbon polymer such as vinylidene fluoride polymer, bonding the particles of the inorganic material together with the bonding agent, and forming a porous substantially inorganic separator film on the flexible substrate.

Also, the particulate magnesium silicate-iron silicate-lead silicate improved separator material of the invention can be employed as the inorganic material in producing the flexible microporous separator film described in copending application, Ser. No. 27,577, filed Apr. 13, 1970, by M. P. Strier and J. S. Smatko, which consists essentially of an organic polymer such as polytetrafluoroethylene, having particles of such inorganic material uniformly distributed in said film.

Although a $CO/CO_2$ atmosphere for the firing operation according to the invention has been found particularly effective as a controlled atmosphere, since the proportion of carbon monoxide to carbon dioxide in such mixture can be readily balanced so as to prevent formation of $Fe_2O_3$ or $Fe_3O_4$ by oxidation, or the formation of metallic Fe by reduction as result of the presence of too great a proportion of CO reducing gas, any other reducing gas atmosphere which can be so controlled or balanced to maintain the iron content of the magnesium-iron-lead silicate separator material in the ferrous form, without formation of ferric compounds or elemental iron can be employed. Thus, for example, there can be employed as reducing atmosphere for the firing operation a mixture of hydrogen and water vapor, the proportions of hydrogen and water vapor being controlled, as in the case of the proportions of carbon monoxide and carbon dioxide in the above noted $CO/CO_2$ preferred atmosphere, to prevent oxidation of the ferrous content of the starting mixture to ferric compounds, or the reduction thereof to elemental iron.

Also, when an inert gas atmosphere is employed for firing the magnesium silicate-iron silicate-lead silicate composition, such firing can take place, for example, in nitrogen, helium, and other inert gases, as well as in argon.

The following are examples illustrating practice of the invention:

EXAMPLE 1

Balsam Gap natural olivine (A) having the composition 47–49% MgO, 7–9% FeO and 30–41% $SiO_2$, and prefired Balsam Gap olivine (B) which is prefired in a gas furnace with the products of combustion in contact with it and produced substantially according to the procedure described in the above U.S. Pat. No. 3,446,668, by firing the Balsam Gap olivine at a temperature of about 1,300°C, in the furnace combustion gases, are provided. A mixture of Balsam Gap natural olivine and 5 mol percent as much lead as there is iron in the olivine, in the form of lead oxide, is also provided, such mixture designated (C). All three of these starting mixtures (A), (B) and (C) are compacted at about 8,000 psi into flat members of about 0.033 inch thick, and the respective members formed of the two compositions (A) and (B) are each subjected to firing in (1) a mixture of a 1 to 1 volume ratio of $CO/CO_2$ at 1,225°C for 1.5 hours, (2) argon at 1,225°C for 2 hours, and (3) air at 1,100°C for 6 hours. Also composition (C) was subjected to firing in a 1 to 1 volume ratio of $CO/CO_2$ at about 1,225°C for about 1 hour. In those tests employing a $CO/CO_2$ mixture, following the firing operation, the last mentioned mixture is scavenged from the furnace chamber with pure argon at about 550°C, and the furnace cooled rapidly to about 250°C, in order to avoid formation of any significant amounts of iron compounds or elemental iron, other than ferrous iron. Corresponding samples of the two starting materials (A) and (B) are not fired at all.

Following the above noted firing operations in the above various atmospheres, the various samples subjected to such firing are granulated and the materials in particulate form are respectively mixed with 68.4 percent zinc powder by weight of the mixture, and the respective mixtures compressed at about 18,000 psi into pellets, and such pellets contacted under the same conditions with 30% KOH solution at ambient temperature. Also, the unheated samples of the two starting materials (A) and (B) are similarly formed into pellets and also contacted with the same concentration KOH solution. Further, a zinc blank is pelleted in the same manner and contacted with the same concentration KOH solution. The gas produced in each test is collected and measured with respect to time.

The materials tested, firing atmosphere, color of the materials both before and after heating, and amount of the gas collected at various specified times from the reaction of the respective pellets contacted with the KOH solution, are set forth in the table below:

EXAMPLE 2

The following are the materials of a starting mixture and the respective amounts and percentages thereof employed:

| Components | Wt. % | Wt. Grams |
|---|---|---|
| Balsam Gap Olivine | 97.6 | 100 |
| Lead Acetate | 2.4 | 2.5 |
| Total | 100.0 | 102.5 |

TABLE

| Starting material | Firing atmos. | Color Before heating | Color After heating | Gas collected (cc.) 1 hr. | 2 hrs. | 6 hrs. | 24 hrs. | 48 hrs |
|---|---|---|---|---|---|---|---|---|
| Balsam gap olivine (A) | Unheated | Off-white | | 2.0 | 3.3 | 11.1 | 45 | 83 |
| Do | $CO/CO_2$ | do | Off-white | 4.4 | 6.9 | 14.9 | 41 | 66 |
| Do | Argon | do | do | 8.9 | 13.1 | 26.4 | 62 | 91 |
| Balsam gap olivine (B) prefired | Not reheated | Red-brown | | 66 | 108 | 220 | 431 | 559 |
| Do | $CO/CO_2$ | do | Off-white | 1.1 | 2.4 | 8.1 | 30 | 53 |
| Do | Argon | do | Very deep slate gray | 5.9 | 13.7 | 41 | 117 | 171 |
| Balsam gap olivine (A) | Air | Off-white | Red-brown | 114 | 154 | 252 | 467 | |
| Balsam gap olivine (B) prefired | do | Red-brown | do | 87 | 139 | 260 | 522 | |
| Balsam gap olivine containing lead (C) | $CO/CO_2$ | | | 0.5 | 1.0 | 3.4 | 14.1 | 25.4 |
| Zinc blank | | | | 0.0 | 0.0 | 0.3 | 1.5 | 3.0 |

Although the results from the above Table show markedly reduced gassing rates for both the Balsam Gap olivine material (A) and the Balsam Gap olivine prefired material (B) produced according to the above patent, in the presence of zinc in alkali when such materials are fired in the $CO/CO_2$ or argon atmosphere, according to my above copending application, as compared to the Balsam Gap olivine prefired material (B) produced according to the patent but which is not reheated or refired in such reducing or inert atmosphere, in the presence of the zinc in alkali, it is noted that the gassing rates for the Balsam Gap olivine containing lead, according to the present invention, fired in $CO/CO_2$ atmosphere, had substantially lower gassing rates, that is less than one-half as much, as compared to the Balsam Gap olivine material (A) or (B) fired in either the $CO/CO_2$ or argon atmosphere, according to my above copending application.

Thus, noting particularly the gassing rates at the 6 hour, 24 hour and 48 hour intervals from the table, it is seen that the gassing rates for the Balsam Gap olivine containing lead fired in the $CO/CO_2$ atmosphere according to the present invention, are 3.4, 14.1 and 25.4, respectively, as compared to the lowest corresponding values of 8.1, 30 and 53, respectively, for the Balsam Gap olivine material (A) or (B), fired in either the $CO/CO_2$ or argon atmosphere.

Note also the remarkable reduction of gassing in the presence of zinc for the lead-containing Balsam Gap olivine material (C) fired in the $CO/CO_2$ atmosphere as compared to the gassing produced when both of the materials (A) and (B) are fired in air according to the above patent.

It will be noted further that the initial Balsam Gap olivine material (A) and which is unheated, shows relatively low gassing because the iron content of such initial material is essentially in the ferrous form.

The minimal gassing rates for the zinc blank shown in the table above clearly indicate that the substantial gassing taking place where olivine or a magnesium silicate-iron silicate composition is in contact with the zinc, results from the reaction of the zinc with the ferric iron content of the olivine or of the magnesium silicate-iron silicate composition, and which gassing is substantially reduced according to the invention and shown in the table above, by firing an olivine material containing lead (C) in a reducing atmosphere such as a properly balanced $CO/CO_2$ mixture.

The lead acetate is dissolved in a liquid containing 15 cc methanol and 4 cc water. Then 40 cc more of ethanol is added. This solution is mixed with the olivine powder to yield a lumpy paste. Separately, 2 cc of concentrated ammonium hydroxide is dissolved in 10 cc methanol, and this is added to the above paste with thorough stirring. After one-half hour of stirring with coincident partial evaporation of the alcohol, there is added to the crumbly damp mass 10 cc of acetone containing 5.1 grams Carbowax–4000, understood to be a polyethylene glycol having a molecular weight of about 4,000. This mixture is dried on a hot plate, with continuous stirring. The crumbs are pressed into blocks at 18,000 psi. The blocks are fired in air at 500°C. for one-half hour, then they are fired in argon for 2 hours at 1,250°C.

The cooled blocks are pulverized in a Bico Pulverizer to 16 mesh, and then the granular material is ball-milled in acetone for 48 hours. The material is then filtered, and the wet cake mixed with 30 cc hot acetone containing 5 grams Carbowax–4000. The material is dried, and the resulting crumbs are granulated on screens to yield a pressing granulation between 60 mesh and 150 mesh. The pressing powder is pressed into plaques at 8,000 psi, and fired in an electric furnace, first in air at 450°C. for one-half hour, and then in argon at 1,150°C. for 15 minutes, to yield a separator having a porosity corresponding to a water absorption of 23.7 percent, and an apparent density of 1.85g/cc. Modulus of rupture is about 6,100 psi. The resulting separator contains about 90 mol percent magnesium silicate, about 9 mol percent ferrous silicate and about 1 mol percent lead silicate.

EXAMPLE 3

The following mixture of components is prepared:

| Components | Wt. % | Wt. Grams |
|---|---|---|
| Balsam Gap Olivine | 91.6 | 250 |
| Litharge (lead oxide) | 8.4 | 22.8 |
| Total | 100.0 | 272.8 |

The components are milled in a ball mill for 24 hours in water, followed by filtration, and drying. The dry cake is crumbled and sprayed with just enough water to increase the weight by 5 percent. Then the mass is stored in a jar or sealed plastic bag for 8 hours to uniformly distribute the water. The crumbs are then pressed into blocks and dried for 4 hours at 120°C. in air. The blocks are transferred to crucibles having a fairly good-fitting cover. This crucible is placed inside another larger crucible having pellets of a previously fired batch of comparable composition in the annular space. The outer crucible also has a snug-fitting cover. The crucible pack is placed in a bell jar and evacuated to one micron pressure, and then back filled with argon.

The crucible pack is then transferred into an electric furnace whose chamber can be kept filled with argon. Firing is conducted for 1 hour at 1,270°C. The cooled blocks are crushed in a Bico pulverizer to 16 mesh and then reduced to fine size in a ball mill for 48 hours in water. The product is filtered, and the water in the damp cake is displaced with acetone.

The resulting cake is then made into a paste with 13.5 grams of Carbowax–4000 dissolved in hot acetone. The paste is dried in an ambient air draft in a hood, and the resulting crumbs are granulated on screens to retrieve a pressing granulation between 60 mesh and 150 mesh. Separator plaques are pressed from this powder. One set of plaques is fired at 450°C. in air for 15 minutes to remove the volatiles, followed by firing thereafter in argon at 1,200°C. for 25 minutes, yielding separators of a porosity averaging 14.5 percent water absorption, density of 2.19 g/cc., resistivity in 30% KOH of 12.2 ohm-cm. and a modulus of rupture of 13,800 psi.

Another set of plaques is fired as above to eliminate the volatiles, and then fired in a 1:1 mixture of CO and $CO_2$ at 1,200°C. for 25 minutes, yielding separators averaging 13.7 percent water absorption, density of 2.28 g./cc., and modulus of rupture of 14,800 psi. The color of these separators was a slightly lighter shade of gray, than those fired in argon. The resulting separators contain about 87.4 mol percent magnesium silicate, about 9.69 mol percent ferrous silicate and about 2.91 mol percent lead silicate.

EXAMPLE 4

The following mixture of components is prepared:

| Components | Wt. % | Wt. Grams |
|---|---|---|
| Siderite | 12.7 | 58.0 |
| Cab-O-Sil | 26.3 | 120.2 |
| MgO | 27.8 | 126.8 |
| Lead Acetate | 33.2 | 151.7 |
| Total | 100.0 | 456.7 |

The mineral Siderite ($FeCO_3$), Cab-OSil, which is a colloidal silica, and the MgO are ball-milled in hexane for 16 hours to provide an intimate mixture and fine particle size, followed by filtration and drying. The cake is powdered and made into a medium paste with the lead acetate dissolved in a small amount of hot water. The paste is very thoroughly mixed while heating to assure a very uniform distribution of the lead salt. Then while mixing, 50 grams of ammonium carbonate dissolved in 100 cc of warm water is slowly added to precipitate a basic lead carbonate. Mixing is continued until the mass is dry.

The crumbs resulting therefrom are compressed into blocks about one-quarter inch thick at about 10,000 psi are are then fired in a $CO_2$ atmosphere at 500°C. to eliminate the volatiles. After cooling, the blocks are packed into the crucible arrangement described in Example 3 and fired at 1,240°C. for 2 hours in an argon atmosphere. The cooled blocks having a dense porcelain-like character, are pulverized to 16 mesh in a Bico pulverizer, followed by ball-milling in acetone for 50 hours. The product is filtered, and the acetone in the damp cake is displaced by toluene.

This damp cake is then mixed into a paste with 15 grams of binder (⅓ part napthalene + ⅓ part beeswax + ⅓ part paraffin wax) in 100 cc of hot toluene, the binder weight being approximately 4 percent of the mineral solids weight. The paste is dried, and the resulting crumbs are granulated through screens to yield a pressing granulation between 60 mesh and 150 mesh. Separator plaques are pressed from this powder at about 8,000 psi. One group of plaques is fired first in air at 450°C. for 15 minutes to eliminate the binder, and then fired in argon for 15 minutes at 1,100°C. The separators resulting therefrom have a water absorption of 10.8 percent average, an average density of 2.74 g/cc. and a modulus of rupture of 18,700 psi.

Another group of plaques is fired as above to eliminate the volatiles and then fired in a 1:1 mixture of CO and $CO_2$ at 1,050°C. for 20 minutes. The separators have an average water absorption of 11.1 percent, an average density of 2.70, and modulus of rupture of 18,100 psi. Such separators contain about 80 mol percent magnesium silicate, about 10 mol percent ferrous silicate and about 10 mol percent lead silicate.

The above separators are especially useful for silver-zinc cells undergoing short cycles of deep discharge with significant overcharge (in excess of 5 percent), and for nickel-zinc cells undergoing any cycle regime, especially since the latter must generally be given significant overcharge (sometimes 50-100 percent) to be sure of full capacity in the nickel electrode. The important lead content of these separators reduces drastically the treeing or dendrite formation of the zinc electrode during rapid recharge and overcharge as well as suppresses the gassing tendency of the zinc electrode.

EXAMPLE 5

147 grams of prefired Balsam Gap olivine powder (material (B) of Example 1) is mixed with 14 grams of lead nitrate dissolved in sufficient water to make a thick paste. The paste is mixed while drying to assure uniform distribution of the salt. The dried crumbs are compressed into ¼ inch thick blocks at 10,000 psi, and then are broken into ¼ inch pieces, placed into the crucible combination disclosed in Example 3 and fired in a 1:1 mixture of CO and $CO_2$ atmosphere at 1,200°C, for 4 hours.

The resulting granules are pulverized in a Bico pulverizer to 16 mesh. The granules, now a very light gray color as compared to the dark red rusty color of the initial (olivine) material (B) are ball-milled for 48 hours in hexane, followed by filtration. The damp cake is made into a thick paste with 7.5 grams of Carbowax-–4000 dissolved in 50 cc hot toluene. After drying, the crumbs resulting therefrom are granulated through screens to give a pressing granulation between 60 mesh and 150 mesh. The pressing powder is pressed into plaques at 7,500 psi, and fired in air at 450°C. for 15 minutes, followed by firing in a 1:1 $CO:CO_2$ atmosphere at 1,200°C. for 33 minutes to give separators having a porosity averaging 8.1 percent water absorption, and average density of 2.65 g/cc. The modulus of rupture averaged 18,000 psi. Another group fired for 21 minutes at the same temperature and gas atmosphere averaged 10.3 percent water absorption, density of 2.50 g/cc. Modulus of rupture averaged 15,200 psi.

The latter separators contain about 86.5 mol percent magnesium silicate, about 9.65 mol percent ferrous silicate and about 3.85 mol percent lead silicate.

Referring to the accompanying illustrative drawing, the latter group of separators are assembled in three separate silver-zinc batteries of the type indicated at 10, each consisting of two silver electrodes 12, and one zinc electrode 14, with the zinc electrode sandwiched between two of the above separators 16, one opposite each face of the zinc electrode, such separators contacting the adjacent silver electrodes. The two silver electrodes are connected via leads 18 to a battery terminal 20, and the zinc electrode is connected via a lead 22 to the battery terminal 24. The battery is filled with 30% KOH.

Nominal capacity of the cell is 1.1 Amp. Hr. Discharge is to 50 percent depth over 1 hour, and recharge is made in a three hour period with the maximum voltage allowed to rise to 2.09v. In general about 3–5 percent overcharge is supplied to the cell. Cell life times are as follows: 698 cycles, 783 cycles and 779 cycles. None of the cells show zinc dendrite penetrations, and all the cells are sealed.

EXAMPLE 6

The following mixture of components is prepared:

| Components | Wt. % | Wt. Grams |
| --- | --- | --- |
| Magnesite ($MgCO_3$) | 46.6 | 264 |
| Glassmaker's sand | 21.2 | 120 |
| Jewelers Rouge | 21.4 | 121 |
| $2PbCO_3 \cdot Pb(OH)_2$ | 10.8 | 62 |
| Total | 100.0 | 567 |

All components are ball-milled for 24 hours in water, filtered, dried, remoistened by spraying with water until 6 percent increase in weight occurs, stored over night in a sealed jar, then are pressed into blocks at 15,000 psi. The blocks are fired in closed crucibles in contact with air and the products of combustion, in a gas fired furnace at 1,320°C. for 6 hours. The cooled blocks are pulverized in a Bico Pulverizer to 16 mesh, followed by ball-milling in water for 60 hours. The product is filtered, and the filter cake is dried.

The cake is made into a thick paste with 16 grams of paraffin wax in hot toluene, followed by drying and granulation through sieves to yield a pressing granulation between 60 mesh and 150 mesh. Plaques are pressed at 11,000 psi and fired in air at 450°C. for 15 minutes to drive off the binder, and then fired at 1,210°C. for 17 minutes to yield separators averaging 12.7 percent water absorption, density of 2.34 g./cc, and modulus of rupture of 11,700 psi. Such separators contain about 75 mol percent magnesium silicate, about 19 mol percent ferrous silicate and about 6 mol percent lead silicate.

EXAMPLE 7

Another batch of material as in Example 2 is prepared except that with the 100 grams of Balsam Gap olivine, 3.4 grams of basic lead acetate is used, dissolved in enough water to make a thick paste, which is evaporated to dryness while stirring. The dried crumbs are pressed into blocks and fired in the double crucible arrangement described in Example 3, in an argon atmosphere. The cooled blocks are pulverized to 16 mesh, followed by ball milling in water for 50 hours. The product is filtered and dried. The dried material is made into a thick paste with 4.5 grams of Carbowax-–4000 dissolved in hot acetone, dried, and the crumbs are granulated to a pressing granulation between 60 mesh and 150 mesh. Plaques are pressed at 8,000 psi and are fired at 400°C. for 20 minutes to remove volatiles, then fired at 1,205°C. in 1:1 $CO:CO_2$ atmosphere for 21 minutes to yield separators with an average water absorption of 12.9 percent, and density of 2.33 g/cc, and modulus of rupture of 11,500 psi.

EXAMPLE 8

The magnesium silicate-ferrous silicate-lead silicate separator material produced in Example 2 is ground and ball-milled to fine particle size.

This material is then processed according to Example 1 of above copending application, Ser. No. 27,577, to produce a flexible microporous separator in the following manner:

An amount of 335 grams of such material ground and ball-milled to fine particle size is suspended in 225 grams water to form a 60 percent suspension by weight. An amount of 237.4 grams of Dupont T-30B TFE aqueous emulsion of polytetrafluoroethylene (60.4 percent solids content) is added slowly to such suspension.

After about 20 to 30 minutes of stirring, the resulting homogeneous slurry or aqueous dispersion of the magnesium, ferrous, lead silicate and polytetrafluoroethylene is poured on a pyrex glass plate, and is drawn down by means of a doctor blade set at 0.038 cm (15 mils). The resulting film is dried initially for about 15 minutes in the draft of a laboratory hood at about 70°F, and further dried at ambient room temperature for 15 hours. The dried film is then sintered at 360°C for 20 minutes. About 12 grams of glycerine is added to the slurry prior to casting, per 100 ml of such mixture, to improve film properties and prevent cracking during the following sintering operation.

The resulting sintered film formed of about 70 percent of the magnesium, ferrous, lead silicate and about 30 percent polytetrafluoroethylene, is highly flexible, has uniform distribution of the inorganic silicate particles, and has good stability in aqueous KOH solution at 50° to 100°C.

Although the improved magnesium silicate-iron silicate-lead silicate separators produced according to the invention are particularly advantageous when employed with a zinc electrode to reduce gassing tendency as compared to the magnesium silicate-iron silicate separators of the above patent, it will be noted that the improved separators of the present invention can also be utilized in high energy density batteries containing electrodes other than zinc electrodes, for example in a nickel-cadmium or silver-cadmium battery, with advantageous results in providing reduction of dendrite growth on prolonged cycling, owing to the presence of the lead.

In view of the foregoing, it is seen that the invention provides procedure for producing low-gassing efficient separators, particularly when employed with the zinc electrode, permitting the provision of hermetically sealed long lived secondary batteries, such as efficient sealed silver-zinc and nickel-zinc batteries. In addition, the magnesium silicate-ferrous silicate separators of the invention containing combined lead as lead silicate preferably in relatively small amount, have markedly increased strength, low resistivity, high alkali resistance and an inhibiting effect on zinc dendrite formation.

While I have described particular embodiments of the invention for purposes of illustration, it will be understood that various changes and modifications can be made therein within the spirit of the invention, and the invention accordingly is not to be taken as limited except by the scope of the appended claims.

I claim:

1. A low-gassing battery separator when employed with a zinc electrode, and having high strength and good resistance to alkali, in the form of a porous member having a composition consisting essentially of sintered particles of a solid solution of about 1 to about 99 mol percent magnesium silicate, about 1 to about 90 mol percent ferrous silicate, and about 0.1 to about 50 mol percent lead silicate.

2. A battery separator as defined in claim 1, said separator having a porosity corresponding to a water absorption ranging from about 5 percent to about 50 percent.

3. A battery separator as defined in claim 2, wherein said composition consists essentially of about 45 to about 98 mol percent magnesium silicate, about 2 to about 30 mol percent ferrous silicate, and about 0.2 to about 25 mol percent lead silicate.

4. A battery separator as defined in claim 3, said separator having a modulus of rupture ranging from about 5,000 to about 20,000 psi and a resistivity ranging from about 5 to about 50 ohm-cm.

5. A battery separator as defined in claim 1, wherein said composition consists essentially of sintered particles of a solid solution of olivine and lead silicate, the iron content of said olivine being entirely in ferrous form.

6. A flexible battery separator as defined in claim 1, said sintered composition in particulate form being distributed uniformly in a polymeric organic binder insoluble in aqueous alkaline solutions.

7. In a battery containing a zinc electrode, a low-gassing battery separator in the form of a porous member consisting essentially of sintered particles of a solid solution of about 1 to about 99 mol percent magnesium silicate, about 1 to about 90 mol percent ferrous silicate, and about 0.1 to about 50 mol percent lead silicate.

8. In a battery as defined in claim 7, said composition of said separator consists essentially of sintered particles of a solid solution of olivine and lead silicate the iron content of said olivine being entirely in ferrous form.

9. In a battery as defined in claim 7, said zinc electrode being positioned on one side of said separator and including a silver electrode positioned on the opposite side of said separator.

10. In a battery as defined in claim 8, said zinc electrode being positioned on one side of said separator and including a silver electrode positioned on the opposite side of said separator.

11. A process of producing a low-gassing separator when employed with a zinc electrode, and having high strength and good resistance to alkali, which comprises compacting a mixture of about 1 percent to about 65 percent iron-bearing material, calculated as FeO, about 4 percent to about 56 percent magnesium-bearing material calculated as MgO, and about 0.4 percent to about 69 percent of a lead-bearing material calculated as PbO, and about 15 percent to about 43 percent silica-bearing material, by weight, initially firing said compacted mixture at a temperature in the range of about 1,100°C to about 1,400°C to produce a magnesium silicate-iron silicate composition containing lead silicate, granulating the resulting compacted composition, compacting said granulated composition, and sintering said last mentioned compacted composition at temperature ranging from about 1,000°C to about 1,300°C in a non-oxidizing atmosphere selected from the group consisting of a reducing gas and an inert gas atmosphere, under conditions to maintain the iron content of said composition in the ferrous form, to produce said low-gassing high strength separator having a porosity corresponding to a water absorption of about 5 percent to about 50 percent.

12. The process as defined in claim 11, said mixture containing about 14 percent to about 56 percent magnesium calculated as MgO, about 1 percent to about 26 percent iron calculated as FeO, about 1 percent to about 48 percent lead calculated as PbO and about 24 percent to about 32 percent silica, by weight.

13. The process as defined in claim 11, wherein said iron-bearing material is FeO, said magnesium-bearing material is MgO and said lead-bearing material is PbO.

14. The process as defined in claim 11, wherein said initial firing also is carried out under conditions to maintain the iron content of said composition in the ferrous form.

15. The process as defined in claim 11, including incorporating an organic binder in said mixture prior to said sintering.

16. The process as defined in claim 11, including adding about 2 percent to about 10 percent of an organic binder by weight of total inorganics to said mixture and compacting said mixture prior to said initial firing at about 1,100°C to about 1,400°C, and including incorporating about 2 percent to about 10 percent of an organic binder in said compacted magnesium silicate-iron-silicate composition containing lead silicate, prior to said subsequent sintering from about 1,000°C to about 1,300°C.

17. The process as defined in claim 16, employing a polyethylene glycol as said binder in said mixture, and including pressing said mixture into blocks prior to said initial firing, granulating said blocks following said initial firing, incorporating said polyethylene glycol in the resulting granular mixture of magnesium silicate-iron silicate composition containing and pressing said last mentioned mixture into plaques, followed by said sintering said plaques at a temperature ranging from about 1,000°C to about 1,300°C in said non-oxidizing atmosphere.

18. The process as defined in claim 17, wherein said initial firing also is carried out under conditions to maintain the iron content of said composition in the ferrous form.

19. The process as defined in claim 18, said starting mixture consisting essentially of about 1 percent to about 26 percent iron-bearing material calculated as FeO, about 14 percent to about 56 percent magnesium-bearing material calculated as MgO, and about 1 percent to about 48 percent of a lead-bearing material calculated as PbO, and about 24 percent to about 32 percent silica, by weight.

20. A flexible battery separator as defined in claim 6, said polymeric organic binder being selected from the group consisting of a fluorocarbon polymer and polyphenylene oxide.

21. A process as defined in claim 11, said non-oxidizing atmosphere being selected form the group consisting of a balanced mixture of CO and $CO_2$, a controlled mixture of hydrogen and water vapor, nitrogen, helium and argon.

22. The process as defined in claim 11, said lead-bearing material being selected from the group consisting of lead acetate, lead dioxide, white lead, red lead, litharge, lead hydroxide, tribasic lead silicate, lead sulfate, lead powder, lead nitrate, lead sulfide and lead carbonate.

* * * * *